United States Patent
Zreiq et al.

(10) Patent No.: US 8,738,045 B2
(45) Date of Patent: May 27, 2014

(54) SYSTEM AND/OR METHOD FOR INVERTING CALL ORIGINATION

(75) Inventors: Samer S Zreiq, Haifa (IL); Liron Manor, Haifa (IL); Ron Keidar, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 1669 days.

(21) Appl. No.: 11/737,090

(22) Filed: Apr. 18, 2007

(65) Prior Publication Data

US 2007/0243890 A1  Oct. 18, 2007

Related U.S. Application Data

(60) Provisional application No. 60/793,089, filed on Apr. 18, 2006.

(51) Int. Cl.
*H04W 4/00* (2009.01)

(52) U.S. Cl.
USPC ............. 455/466; 455/412.1; 455/414.1; 455/418; 455/458; 370/328; 370/338

(58) Field of Classification Search
CPC ....... H04W 4/12; H04W 4/14; H04L 12/5895
USPC ............ 455/466, 412.1, 414.1, 418, 458; 370/328, 338
See application file for complete search history.

(56) References Cited

U.S. PATENT DOCUMENTS

| | | | |
|---|---|---|---|
| 5,625,884 A | | 4/1997 | Gitlin et al. |
| 6,249,681 B1 * | | 6/2001 | Virtanen ................ 455/466 |
| 6,389,279 B1 * | | 5/2002 | Calabrese et al. ............ 455/417 |
| 6,501,736 B1 * | | 12/2002 | Smolik et al. .................. 370/252 |
| 6,549,775 B2 * | | 4/2003 | Ushiki et al. ............... 455/432.1 |
| 6,775,548 B1 * | | 8/2004 | Rong et al. ................. 455/452.2 |
| 2003/0045310 A1 | | 3/2003 | Price |

(Continued)

FOREIGN PATENT DOCUMENTS

| | | |
|---|---|---|
| EP | 0665699 A | 8/1995 |
| EP | 1009179 A | 6/2000 |

(Continued)

OTHER PUBLICATIONS

3GPP, "3rd Generation Partnership Project; Technical Specification Group Core Network and Terminals: Point-to-Point (PP) Short Message Service (SMS) support on mobile radio interface (release 6)", Jun. 2005, vol. 6.1.0, Section 5.4 pp. 25-26, Online Resource, URL: http://www.3gpp.org/ftp/Specs/archive/24_series/24.011/24011-610.zip (2 pages).

(Continued)

*Primary Examiner* — Nghi H Ly
(74) *Attorney, Agent, or Firm* — James D. McFarland (57) ABSTRACT

The subject matter disclosed herein relates to a system and method for transmitting messages between a mobile station and a base station in a wireless communication network. In one example, a mobile station is adapted to selectively transmit an origination message in response to receipt of a page message from a base station attempting to initiate a mobile-terminated call. The origination message may initiate a mobile-originated call or session enabling a bi-directional exchange of messages in a single call.

23 Claims, 6 Drawing Sheets

(56) References Cited

U.S. PATENT DOCUMENTS

| | | |
|---|---|---|
| 2004/0151186 A1 | 8/2004 | Akama |
| 2006/0003772 A1* | 1/2006 | Semper .................. 455/452.1 |
| 2006/0099973 A1* | 5/2006 | Nair et al. .................. 455/461 |

FOREIGN PATENT DOCUMENTS

| | | |
|---|---|---|
| GB | 2234649 A | 2/1991 |
| JP | 7336742 A | 12/1995 |
| JP | 11298957 A | 10/1999 |
| JP | 2004289577 A | 10/2004 |
| JP | 2005508578 A | 3/2005 |
| WO | 0225974 A1 | 3/2002 |
| WO | WO02093945 A2 | 11/2002 |
| WO | WO03015356 | 2/2003 |
| WO | 2006009424 A2 | 1/2006 |

OTHER PUBLICATIONS

International Search Report- PCT/US2007/066901—International Search Authority- Sep. 5, 2007 (3 pages).

Written Opinion—PCT/US2007/066901, International Search Authority, European Patent Office, Sep. 18, 2007.

* cited by examiner (PRIOR ART)

FIG.6 though the invention claims the benefit of U.S. Provisional
Application Ser. No. 60/793,089, filed on Apr. 18, 2006.

SYSTEM AND/OR METHOD FOR INVERTING CALL ORIGINATION

This application claims the benefit of U.S. Provisional Application Ser. No. 60/793,089, filed on Apr. 18, 2006.

BACKGROUND

1. Field

The subject matter disclosed herein relates to the transmission of wireless messages using a Short Message Service (SMS).

2. Information

In cellular networks, long SMS messages are typically transmitted between a base station (BS) and a mobile station (MS) over a traffic channel. When an SMS message is to be transmitted to an MS in a traffic channel, a carrier network typically sets up a call or session to transmit the SMS message to the MS. The carrier network also typically tears down the call following completion. The network may keep the call active for a short while, after the message is sent to the MS, to receive an acknowledgment that the message is received at the MS.

SMS messages may enable the use of applications of an MS in a wireless communication network. In some applications, a network may transmit one or more SMS messages in a call initiated by a BS to an MS while the MS typically provides one or more SMS messages in response. However, the network will typically tear down such a call initiated by the BS before the MS is prepared to respond. In such conditions, an MS is typically forced to setup a mobile-originated (MO) call in order to send its SMS messages to the network in response. The need to set up two calls for a single exchange of SMS messages is wasteful of network resources and MS battery power.

Figure 1:
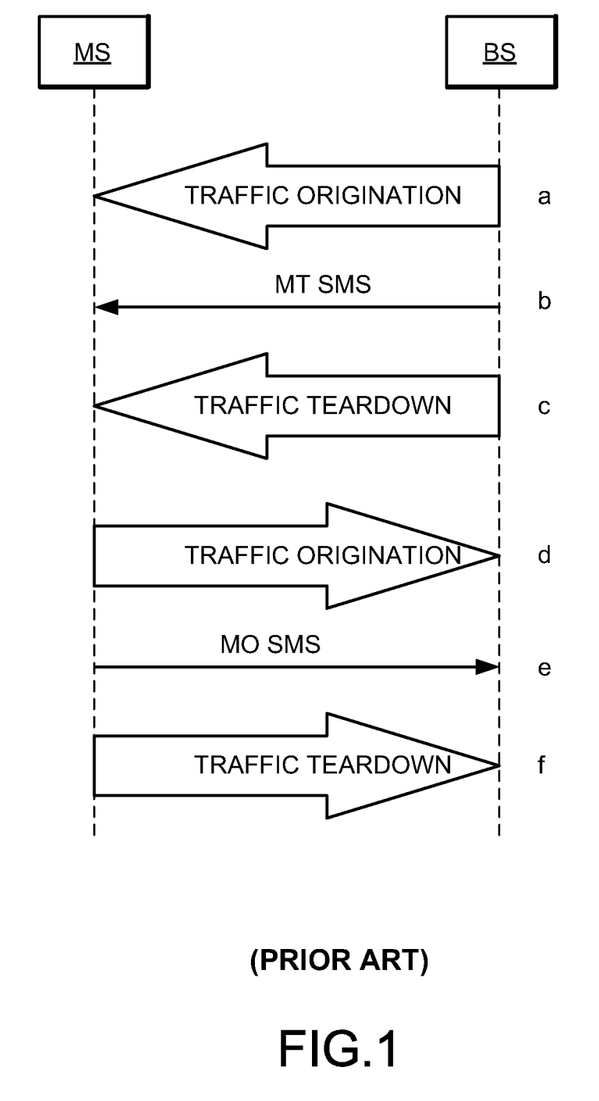
FIG. 1 is a timing diagram of illustrating a prior art exchange of messages between a mobile station (MS) and a base station (BS) using a short message service (SMS).

FIG. 1 illustrates a typical progression of a first mobile terminated (MT) call initiated by a BS and a second, MO call initiated by an MS to facilitate an exchange of SMS messages between the MS and BS. Here, the BS originates the first call in a traffic channel to provide SMS messages to the MS and then tears down the first call. Following tear down of the first call, the MS originates the second call to provide SMS messages to the BS and then tears down the second call.

Figure 2:
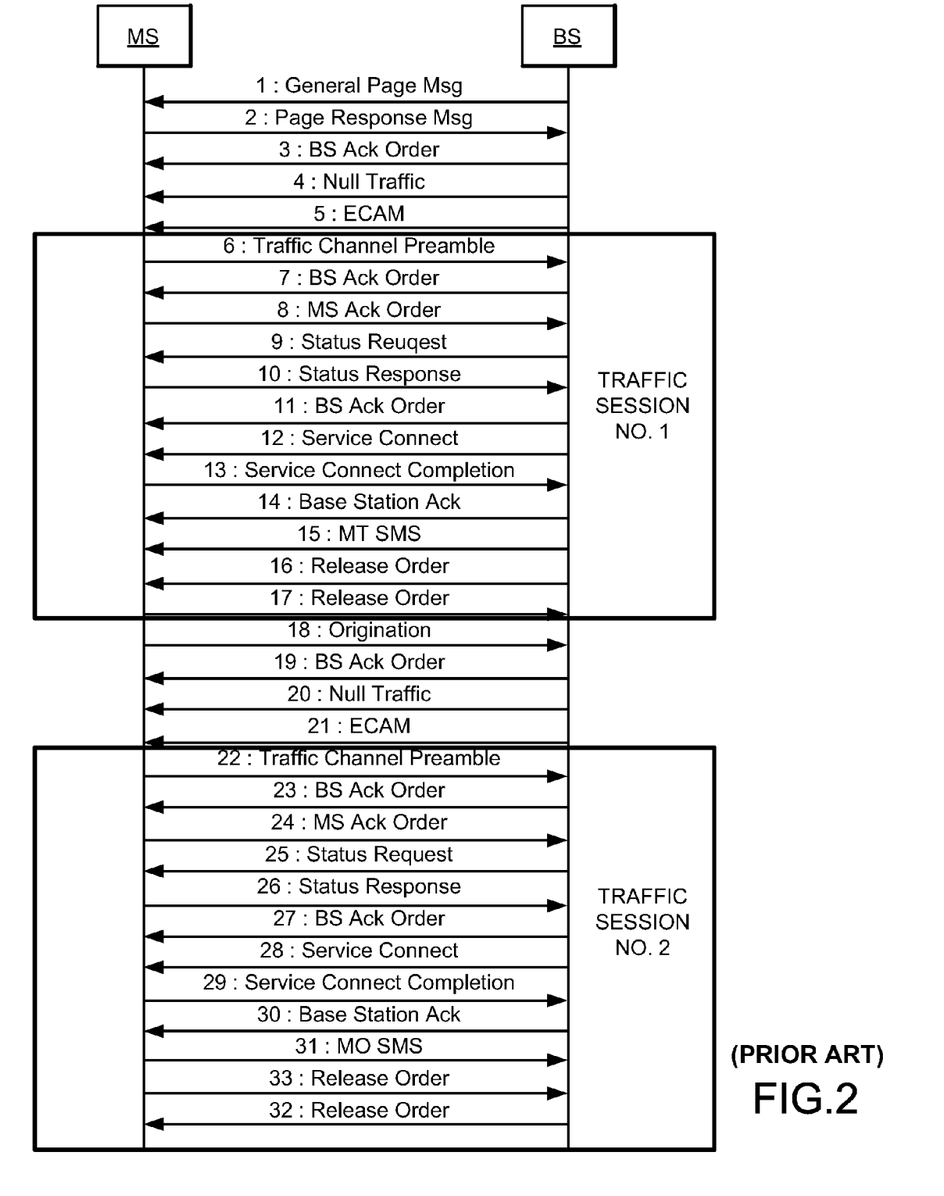
FIG. 2 is a timing diagram of illustrating a prior art exchange of messages between an MS and a BS using an SMS according to a particular protocol implementation.

FIG. 2 illustrates another typical progression of an MT call originated by a BS followed by an MO call initiated by an MS to facilitate an exchange of SMS messages between the MS and BS in a traffic channel according to the cdma2000 protocol. Here, the BS attempts to initiate the MT call at an event comprising transmission of a "General Page Message,", transmits one or more SMS messages to the MS and then initiates tear down of the call at an event comprising transmission of a "Release Order" to the MS. Similarly, the MS originates a second call to the BS at an event comprising transmission of an "Origination" message to the BS, transmits one or more SMS messages to the MS and then initiates tear down the call at an event comprising transmission of a "Release Order" to the BS.

SUMMARY

In one aspect, messages are exchanged between a mobile station (MS) and a base station (BS) according to a short message service (SMS). For example, an MS may receive a message from a BS in an attempt to establish a mobile-terminated (MT) call. In one particular implementation, although claimed subject matter is not limited in this respect, such an MS may initiate a mobile-originated (MO) call instead of acknowledging receipt of the message from the BS. It should be understood, however, that these are merely examples of aspects of disclosed subject matter and that claimed subject matter is not so limited.

BRIEF DESCRIPTION OF THE FIGURES

Non-limiting and non-exhaustive features will be described with reference to the following figures, wherein like reference numerals refer to like parts throughout the various figures

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile devices memory devices. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "enabling," "reducing," "associating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, process described herein, with reference to flow diagrams or otherwise, may also be executed and/or controlled, in whole or in part, by such a computing platform.

Communication techniques described herein may be implemented in various wireless communication networks such as a wireless wide area network (WWAN). The term "network" and "system" may be used interchangeably herein. A WWAN may comprise a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available.

In one particular example, although claimed subject matter is not limited in this respect, a mobile station (MS) may transmit and/or receive messages according to a short message service (SMS) protocol in support of one or more "applications" of the MS in a wireless communication network. In this context, such an application may comprise one or more practical functions enabling completion of a particular task, performance of a particular action and/or achievement of a desired result. Such an application may comprise, for example, telephonic voice communication, paging or electronic mail. Other applications enabled by messaging according to the SMS protocol may comprise, for example, position location during an emergency (e.g., emergency 911 calls), Web Application Protocol (WAP) and binary runtime environment for wireless (BREW), applications using low duty cycles such as tracking devices capable of obtaining and forwarding position location information, just to name a few.

In a particular implementation, an SMS message may be transmitted in a wireless communication network in either a "signaling channel" or a "traffic channel." In a particular example, a traffic channel may comprise "uplink" and "downlink" portions in a wireless communication link for transmitting messages such as SMS messages between a base station (BS) and an MS. Here, such an uplink portion may transmit messages from an MS to a BS while a downlink portion may transmit messages from a BS to an MS.

In one feature, a wireless communication network may determine whether such an SMS message is to be transmitted in a signaling channel or a traffic channel based, at least in part, on a particular network configuration and a size of an SMS message to be transmitted. In a particular example, an SMS message may be transmitted in a traffic channel through a "call" or "session" that is initiated by a BS or MS, for example.

In one particular implementation, applications may be enabled by one or more computer programs that perform tasks in connection with providing a service and/or resource to a user. As illustrated below, an MS may comprise a computing platform that is capable of hosting one or more computer programs comprising machine-readable instructions that are stored in a storage medium. In one particular implementation, such computer programs hosted on an MS may enable one or more applications as illustrated elsewhere herein. It should be understood, however, that this is merely one particular example of how an application may be enabled at an MS and claimed subject matter is not limited in this respect.

Applications performed with an MS may consume power resources which may, at least in part, contribute to requirements of an MS design. For example, increased power consumption required by an application may increase overall requirements for battery size and form factor of a manufactured MS unit, for example. Thus, in one particular aspect, enabling an MS to perform particular applications while consuming less power may enable manufacturing MS units with smaller batteries, form factor and weight. Accordingly, such MS units may be manufactured more cost effectively as a result.

Briefly, in one aspect of this disclosure, an MS may initiate an MO call in response to receipt of a message from a BS attempting to establish a mobile-terminated (MT) call. Here, the BS and the MS may exchange SMS messages in the single MO call, avoiding the need for setting up two calls for such an exchange of SMS messages, thereby enabling a reduction in power consumption requirements for applications employing such an exchange of SMS messages between a BS and an MS. It should be understood, however, that this is merely one example implementation and that claimed subject matter is not so limited.

Figure 3:
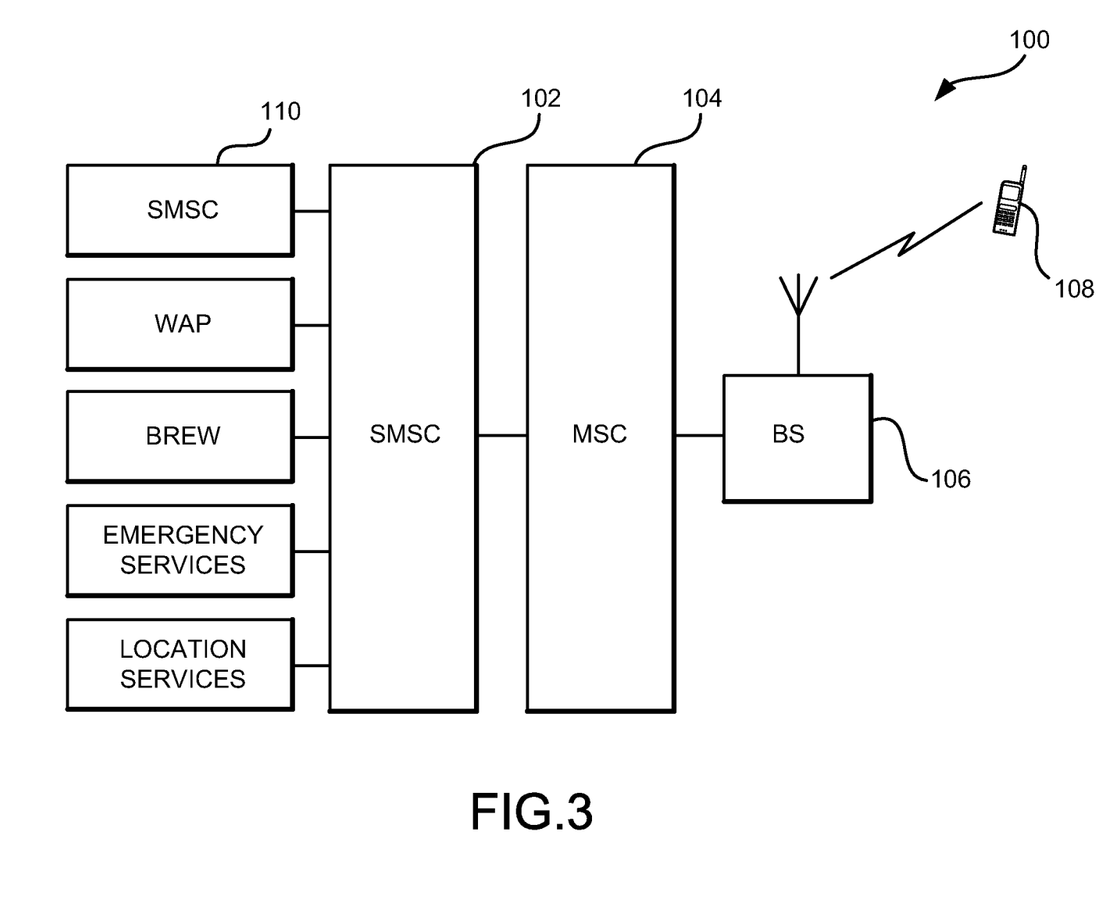
FIG. 3 is a schematic diagram of a network topology according to a particular example.

FIG. 3 is a schematic diagram of a network topology 100 capable of providing an SMS according to a particular example. Here, MS 108 communicates with BS 106 over a wireless communication link according to any one of several wireless communication protocols such as those identified above, for example. Mobile services switching center (MSC) 104 provides signaling functions for communication between MS 108 and other devices (e.g., connected to MSC 104 by a cellular network or a public switched telephone network). In a particular example, MSC 104 may provide a traffic channel where a call or session which, as illustrated above, may originate at MS 108 as a mobile-originated (MO) call or originate at BS 106 as a mobile-terminated (MT) call. In a particular example, MS 108 may initiate a call or session by transmitting an origination message to BS 106 and initiate a termination or "tear down" of the call or session by transmitting a subsequent message to BS 106. Also, BS 106 may attempt to initiate a call or session with MS 108 by transmitting a page message to MS 108 and initiate a termination or tear down of the call or session by transmitting a subsequent message to MS 108. It should be understood, however, that these are merely examples of how a BS and MS may initiate and tear down a call and/or session in a wireless communication network, and claimed subject matter is not limited in this respect.

In one particular aspect, MS 108 may communicate with an SMS center (SMSC) 102 through MSC 104 using messages formatted to any one of several SMS protocols such as, for example, an SMS protocol provisioned over any one of several wireless communication networks as identified above. Here, services and/or applications 110 such as, for example, voice mail, WAP, BREW, emergency response or location services may enabled through a communication channel provisioned through transmission of SMS messages between SMSC 102 and MS 108. It should be understood, however, that these are merely examples of applications and/or services that may be enabled by the transmission of SMS messages between an MS and a BS, and claimed subject matter is not limited in these respects.

In particular examples, applications and/or services associated with MS 108 may entail bi-directional communication with BS 106 involving an exchange of SMS messages between BS 106 and MS 108. Here, such an exchange of SMS messages may be transmitted between BS 106 and MS 108 in a traffic channel as part of a call or session. As illustrated below in FIGS. 4 and 5 according to a particular example, such an exchange of SMS messages may be conducted in a single call or session. This may be accomplished, for example, by MS 108 inverting an origination of a call or session, which is attempted by BS 106. In the presently illustrated implementation, BS 106 may "attempt" to initiate an MT call or session in a traffic channel by transmitting a page message to MS 108. Accordingly, a call or session is not necessarily established through mere transmission of a message from a source to a destination. In the particular illustrated implementation, for example, such an MT call or session may be initiated or established following receipt of an acknowledgment of the page message received at BS 106.

Figure 4:
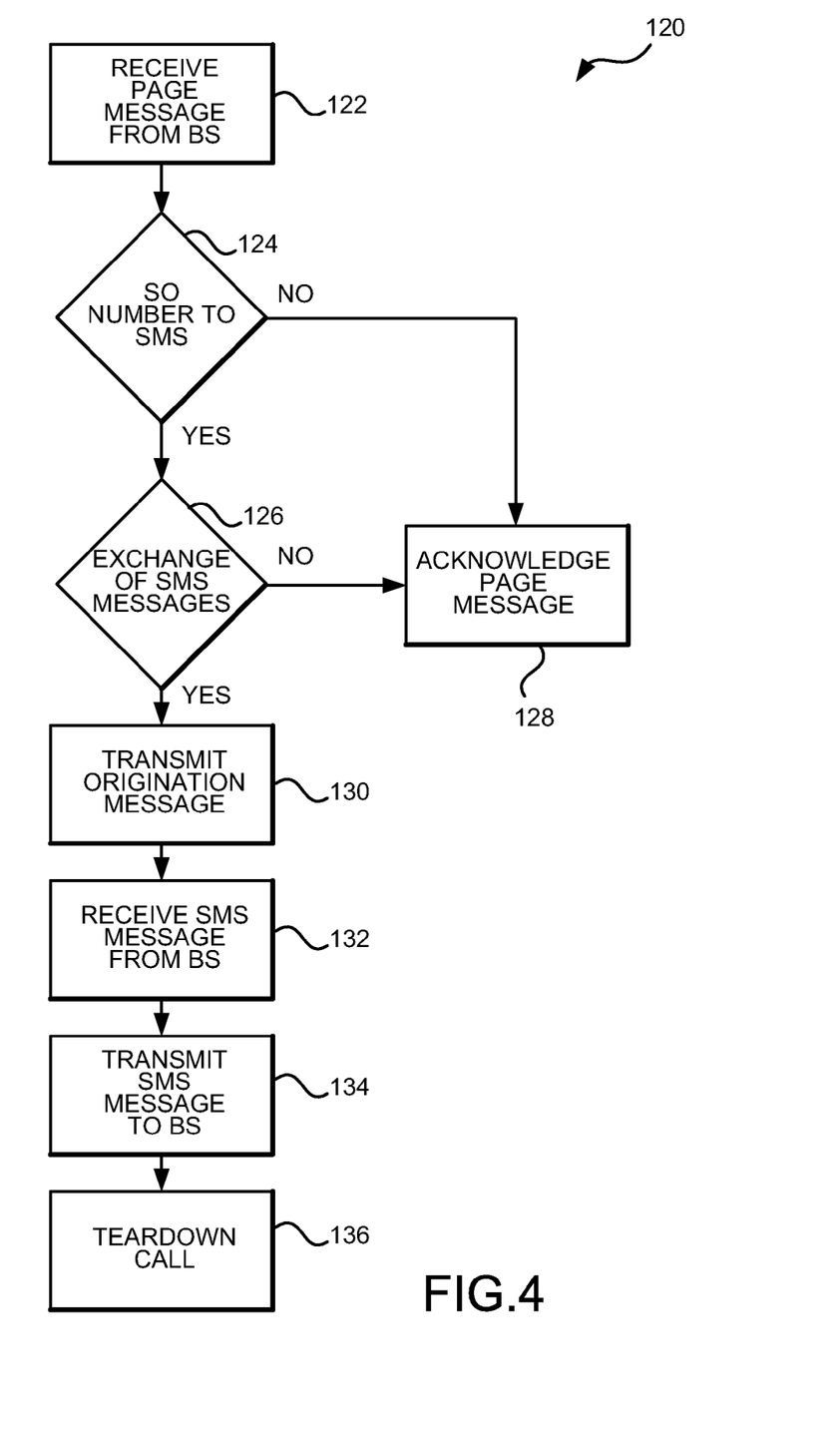
FIG. 4 is a flow diagram illustrating a process executed by an MS to invert origination of a call according to one aspect of an implementation.

FIG. 4 is a flow diagram illustrating a process 120 executed by an MS to invert origination of a call or session attempted by a BS to exchange messages between an MS and a BS in a single call. Particular reference herein is made to events of a timing diagram in FIG. 5 which may occur in a particular implementation where a BS and an MS are capable of transmitting and receiving SMS messages over a wireless communication network provided according to cdma2000 as a particular example presented for the purpose of illustration. It should be understood, however, that this is merely one implementation in a wireless communication network provided for the purpose of illustration, and that other wireless communication networks employing different protocols may be adapted to exchange SMS messages between an MS and BS in a similar process, and that claimed subject matter is not limited in this respect.

Figure 5:
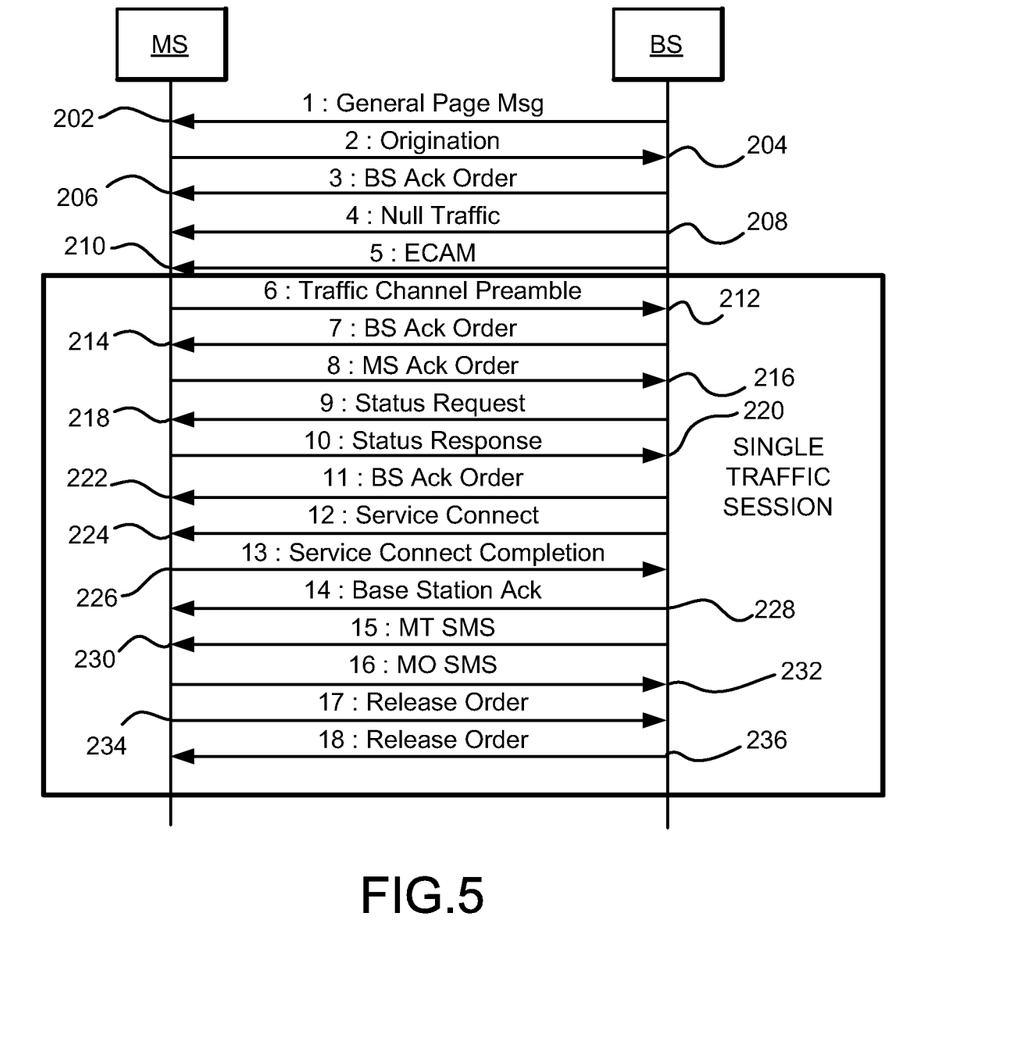
FIG. 5 is a timing diagram illustrating an exchange of messages between an MS and a BS in a single call according to one example.

In a particular implementation in cdma2000, a BS may attempt to initiate a call with an MS by transmitting a page message to the MS including a service option (SO) number identifying a service requested of the MS and an identifier associated with the MS. Upon receipt of such a page message at block 122, the MS may determine whether the page message is requesting an SMS service at diamond 124 and acknowledge the received page message in a return message at block 128 if the page message is not requesting an SMS service. In the particular implementation of cdma200, for example an SO number of "6" or "14" may indicate that the requested service is an SMS service. Upon determining that the received page message is requesting an SMS service, the MS may selectively decide at diamond 126 whether to transmit an origination message as illustrated in the events of FIG. 5 to initiate an MO call or session, or acknowledge the page in a return message. Here, for example, one or more computer programs hosted on the MS enabling a particular application may determine that the session or call requested by the page message would initiate a bi-directional exchange of SMS messages.

Here, at block 130, an MS may respond to a page message (e.g., at event 202 of FIG. 5) with an origination message (e.g., at event 204 of FIG. 5) to initiate an MO call or session. In a particular implementation, although claimed subject matter is not limited in this respect, a BS may be configured to resolve contention between an origination message transmitted from an MS simultaneously with transmission of a page message from the BS in favor of the origination message from the MS. Here, upon receiving such an origination message from the MS, the BS may discard or abandon an earlier, unacknowledged page message (e.g., transmitted at event 202). Additionally, the MS may be configured to ignore subsequent page messages from a BS following transmission of an origination message from the MS.

In one aspect, upon transmitting a page message (e.g., at event 202), such a BS may be configured to respond to an origination message from an MS as part of an MO session or call in the absence of receiving a message acknowledging the page message. Accordingly, the BS may respond to such an origination message (e.g., at event 204) with an acknowledgement message (e.g., at event 206), and subsequently transmit a mobile-terminated (MT) SMS message to the MS (e.g., at event 230) received by the MS at block 132. At block 134, the MS may then transmit a mobile-originated (MO) SMS message (e.g., at event 232) to complete an exchange of SMS messages between the MS and the BS, and initiate teardown of the single MO call at block 136 (e.g., at event 234).

Figure 6:
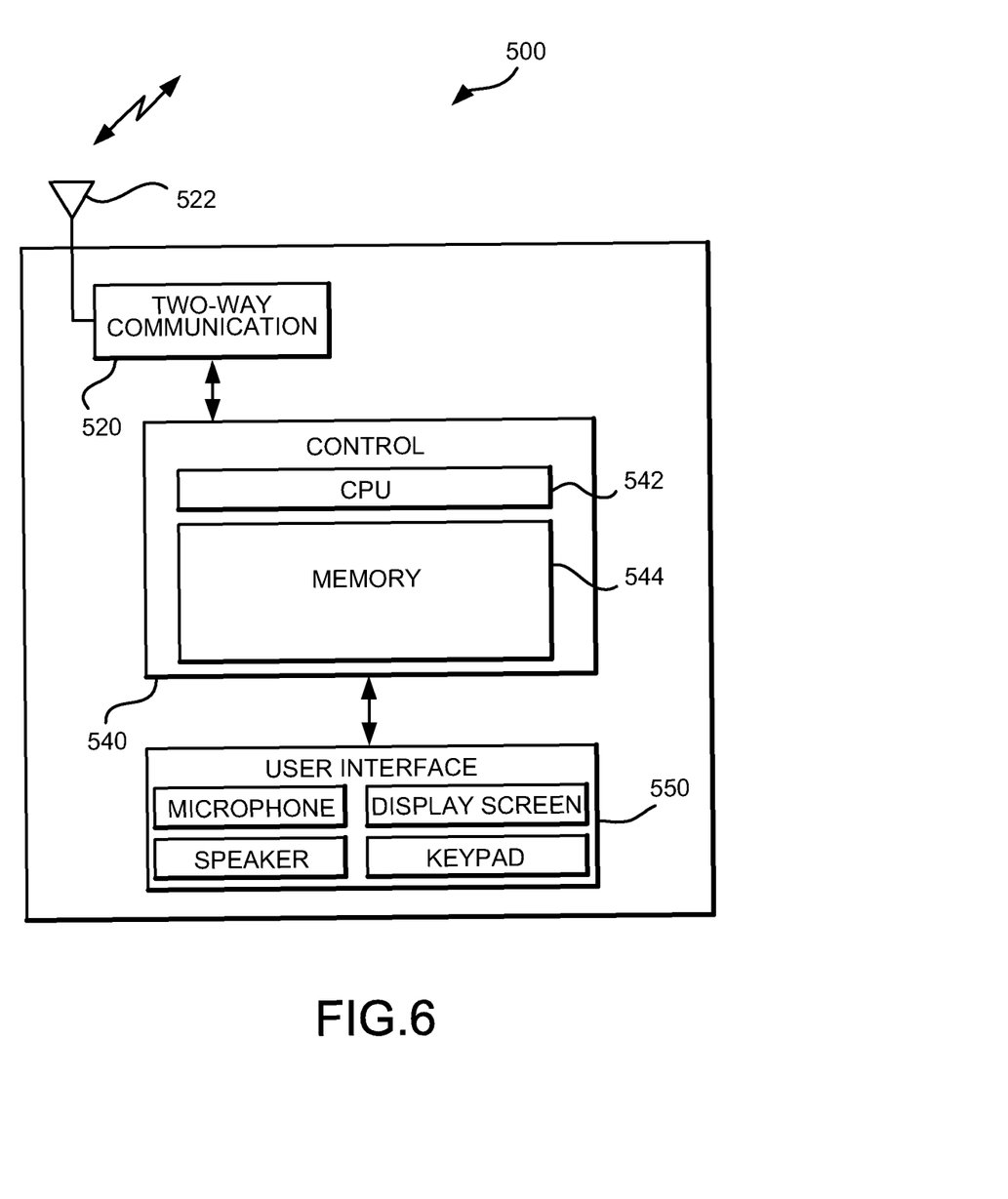
FIG. 6 is a schematic diagram of an MS according to one aspect of an implementation.

FIG. 6 is a schematic diagram of an MS according to one aspect of an implementation. Here, MS 500 may include a two-way communication system 520 comprising a transmitter and a receiver (not shown) adapted to communicate with a base station (not shown) according to any one of several wireless communication protocols such those employed in any of the aforementioned wireless communication networks. Mobile controller 540 may include a computing platform comprising a central processing unit (CPU) 542 and associated memory 544, hardware, software, and firmware. It will be understood as used herein that the CPU 542 can, but need not necessarily include, one or more microprocessors, embedded processors, controllers, application specific integrated circuits (ASICs), digital signal processors (DSPs), and the like. The term CPU is intended to describe the functions implemented by the system rather than specific hardware or devices. Memory 544 may comprise one or more types of storage media identified above. A user interface 550 may allow a user to enter information into and receive information, such as voice or data, from MS 500. The user interface 550 may include, for example, a keypad, a display screen, a microphone, and a speaker.

MS 500 may comprise any one of several devices capable of communicating with other devices in a wireless communication network. For example, MS 500 may comprise a mobile telephone, personal digital assistant, and/or a personal computer. Another example of an MS 500 is a location tracking device capable of obtaining and forwarding position location information, such as a low duty cycle (LDC) device that consumes very little power when inactive. Such LDC devices can be used, for example, to track and/or locate children, pets, or any other moving object, and send an alert to designated mobile phones or other devices subsequent to activation. It should be understood, however, that these are merely specific examples of an MS and claimed subject matter is not limited to any particular type of MS.

In particular aspects, MS 500 may be capable of exchanging SMS messages with a BS through a traffic channel as illustrated above in particular examples. Additionally, MS 500 may enable any one of several applications that are enabled by an exchange of messages between MS 500 and a BS as illustrated above. Here, for example, techniques for facilitating an exchange of messages between MS 500 and a BS in a single call may be executed and/or controlled by the execution by CPU 542 of machine-readable instructions stored in memory 544.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
   receiving a page message from a base station (BS) at a mobile station (MS), the page message configured to initiate a mobile-terminated (MT) call or an MT session between the BS and the MS to enable sending at least one short message service (SMS) message from the BS to the MS during the MT call or the MT session;
   in response to receiving said page message transmitted to the MS to initiate said MT call or said MT session, transmitting, by the MS, an origination message to said BS to initiate a mobile-originated (MO) call or MO session instead of causing establishment of said MT call or said MT session; and
   upon initiating the MO call or the MO session in response to receiving from the BS said page message configured to initiate the MT call or the MT session, causing a bi-directional exchange of SMS messages between the MS and BS during the MO call or the MO session such that the at least one SMS message from the BS to the MS is received at the MS during the MO call or the MO session, and at least one message from the MS to the BS is transmitted from the MS during the MO call or the MO session.

2. The method of claim 1, further comprising enabling one or more applications in a wireless communication network based, at least in part, on said at least one SMS message from the MS to the BS.

3. The method of claim 1, further comprising tearing down said MO call or said MO session following transmission of said at least one SMS message from the MS to the BS.

4. The method of claim 1, wherein said page message and said origination message are transmitted according to a cdma2000 protocol.

5. The method of claim 1, and further comprising:
   transmitting said origination message instead of an acknowledgement of said page message based, at least in part, on a service option number in said page message.

6. The method of claim 1, wherein receipt of said origination message at said BS causes said BS to determine said page message as unacknowledged and discard or abandon said MT call.

7. A mobile station comprising:
   a transmitter adapted to transmit messages to a base station (BS) in an uplink portion of a wireless communication link;
   a receiver adapted to receive messages from said BS in a downlink portion of said wireless communication link; and
   a controller adapted to, in response to receipt from said BS of a page message configured to initiate a mobile-terminated (MT) call or MT session in said downlink portion to enable sending at least one short message service (SMS) message from the BS to the MS during the MT call or the MT session, initiate transmission of an origination message in said uplink portion to initiate a mobile-originated (MO) call or MO session instead of causing establishment of said MT call or said MT session;
   wherein upon initiating the MO call or the MO session in response to receiving from the BS said page message configured to initiate the MT call or the MT session, a bi-directional exchange of SMS messages between the MS and BS during the MO call or the MO session is performed such that the at least one SMS message from the BS to the MS is received at the MS during the MO call or the MO session, and at least one message from the MS to the BS is transmitted from the MS during the MO call or the MO session.

8. The mobile station of claim 7, wherein said mobile station is further adapted to:
   receive the at least one SMS message from said BS during said MO call or said MO session; and
   transmit at least one SMS message from the MS to the BS during said MO call or said MO session.

9. The mobile station of claim 8, wherein said controller is further adapted to enable one or more applications in a wireless communication network based, at least in part, on said at least one SMS message from the MS to the BS.

10. The mobile station of claim 8, wherein said controller is further adapted to initiate tearing down said MO call or said MO session following transmission of said at least one SMS message from the MS to the BS.

11. The mobile station of claim 7, wherein said page message and said origination message are transmitted according to a cdma2000 protocol.

12. The mobile station of claim 7, wherein said controller is further adapted to initiate transmission of said origination message instead of an acknowledgement of said page message based, at least in part, on a service option number in said page message.

13. An article comprising:
a non-transitory storage medium comprising machine-readable instructions stored thereon which are executable by a computing platform to:
detect receipt of a page message from a base station (BS), the page message configured to initiate a mobile-terminated (MT) call or MT session to enable sending at least one short message service (SMS) message from the BS to the MS during the MT call or the MT session;
in response to said detected receipt of said page message transmitted to initiate said MT call or said MT session, initiate transmission of an origination message to initiate a mobile-originated (MO) call or MO session instead of causing establishment of said MT call or said MT session; and
upon initiating the MO call or the MO session in response to receiving from the BS said page message configured to initiate the MT call or the MT session, cause a bi-directional exchange of SMS messages between the MS and BS during the MO call or the MO session such that the at least one SMS message from the BS to the MS is received at the MS during the MO call or the MO session, and at least one message from the MS to the BS is transmitted from the MS during the MO call or the MO session.

14. The article of claim 13, wherein said instructions are further executable by said computing platform to enable one or more applications in a wireless communication network based, at least in part, on said at least one SMS message from the MS to the BS.

15. The article of claim 13, wherein said instructions are further executable by said computing platform to initiate tearing down said MO call or said MO session following transmission of said at least one SMS message from the MS to the BS.

16. The article of claim 13, wherein said page message and said origination message are transmitted according to a cdma2000 protocol.

17. The article of claim 13, wherein said instructions are further executable by said computing platform to:
initiate transmission of said origination message instead of an acknowledgement of said page message based, at least in part, on a service option number in said page message.

18. An apparatus comprising:
means for receiving a page message from a base station (BS) at a mobile station (MS), the page message configured to initiate a mobile-terminated (MT) call or an MT session between the BS and the MS to enable sending at least one short message service (SMS) message from the BS to the MS during the MT call or the MT session;
means for transmitting an origination message to said BS to initiate, in response to receiving said page message transmitted to the MS to initiate said MT call or said MT session, a mobile-originated (MO) call or MO session instead of causing establishment of said MT call or said MT session; and
means for causing a bi-directional exchange of SMS messages, upon initiating the MO call or the MO session in response to receiving from the BS said page message configured to initiate the MT call or the MT session, between the MS and BS during the MO call or the MO session such that the at least one SMS message from the BS to the MS is received at the MS during the MO call or the MO session, and at least one message from the MS to the BS is transmitted from the MS during the MO call or the MO session.

19. The apparatus of claim 18, further comprising means for enabling one or more applications in a wireless communication network based, at least in part, on said at least one SMS message from the MS to the BS.

20. The apparatus of claim 18, further comprising means for tearing down said MO call or said MO session following said transmitting said at least one SMS message from the MS to the BS.

21. A method for communication, comprising:
receiving a downlink message from a base station (BS) to a mobile station (MS), the downlink message configured to invoke origination of a mobile-terminated (MT) short message service (SMS) call between the BS and the MS to enable sending at least one SMS message from the BS to the MS during the MT SMS call;
in response to receiving the downlink message transmitted to the MS to invoke origination of the MT SMS call, sending an uplink message from the MS to the BS so as to cause a mobile-originated (MO) SMS call to be set up on a traffic channel between the BS and the MS instead of causing establishment of said MT SMS call; and
upon causing the MO SMS call to be set up in response to receiving from the BS the downlink message configured to invoke origination of the MT SMS call, causing a bi-directional exchange of SMS messages between the MS and BS during the MO SMS call, including:
receiving at the MS the at least one SMS message from the BS to the MS over the traffic channel; and
responding to the at least one SMS message from the BS to the MS by sending a at least one SMS message from the MS to the BS over the traffic channel.

22. The method according to claim 21, further comprising tearing down the MO SMS call only after both the at least one SMS message from the BS to the MS and the at least one SMS message from the MS to the BS have been sent over the traffic channel.

23. A mobile station (MS), comprising:
a transmitter; and
a receiver, wherein said MS is further adapted to:
receive a downlink message from a base station (BS), the downlink message configured at said receiver to invoke origination of a mobile-terminated (MT) short message service (SMS) call between the BS and the MS to enable sending at least one SMS message from the BS to the MS during the MT call;
in response to receiving the downlink message transmitted by the BS to the MS to invoke origination of the MT SMS call, transmit an uplink message through said MS to the BS so as to cause a mobile-originated (MO) SMS call to be set up on a traffic channel between the BS and the MS instead of causing establishment of said MT SMS call;
wherein upon causing the MO SMS call to be set up in response to receiving from the BS the downlink message configured to invoke the origination of the MT SMS call, a bi-directional exchange of SMS messages between the MS and BS is performed during the MO SMS call to:
receive at said receiver the at least one SMS message from the BS to the MS over the traffic channel; and
respond to the at least one SMS message from the BS to the MS by transmitting at least one SMS message from the MS to the BS through said transmitter over the traffic channel.

* * * * *